Sept. 3, 1929.   H. J. MURRAY   1,726,994
VEHICLE SIGNAL DEVICE
Filed July 7, 1923
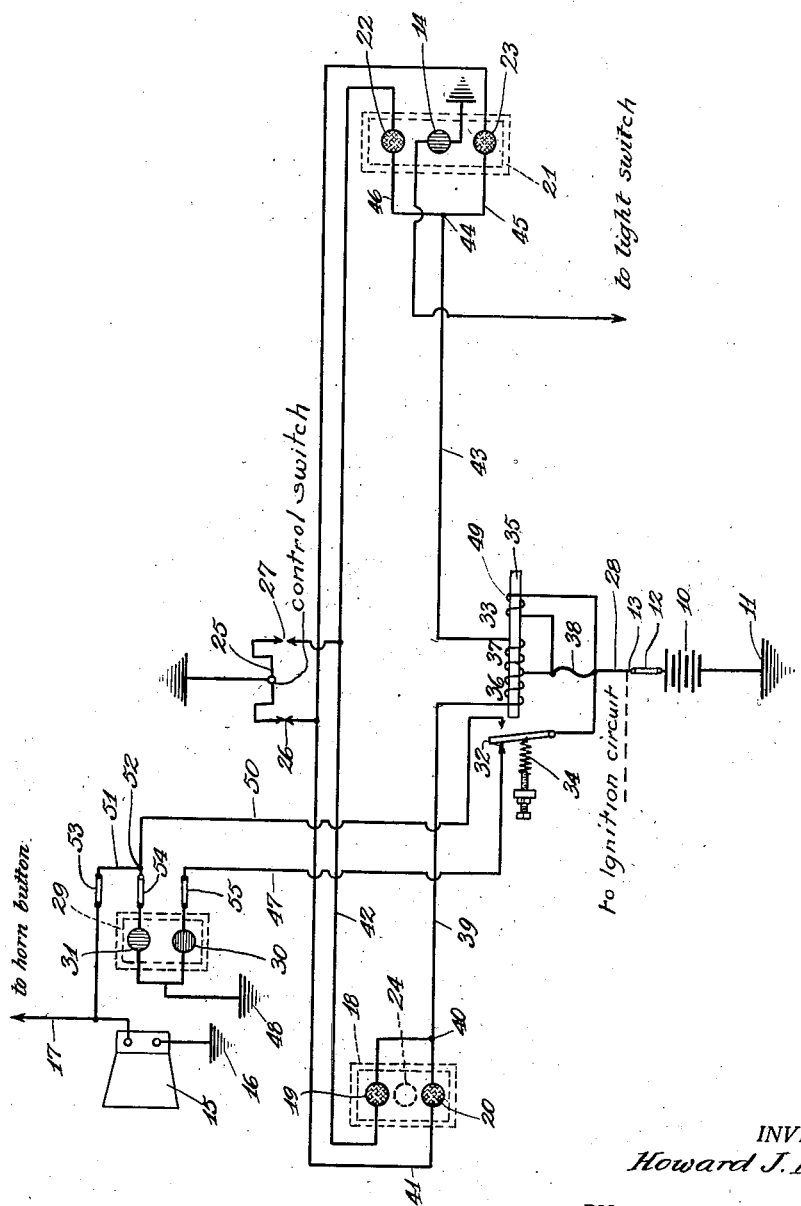
INVENTOR
*Howard J. Murray*
BY
*Warren S. Orton.*
ATTORNEY Patented Sept. 3, 1929.

1,726,994

UNITED STATES PATENT OFFICE.

HOWARD J. MURRAY, OF BROOKLYN, NEW YORK, ASSIGNOR TO R. M. COMPANY, INC., OF EAST PITTSBURGH, PENNSYLVANIA, A CORPORATION OF DELAWARE.

VEHICLE SIGNAL DEVICE.

Application filed July 7, 1923. Serial No. 650,009.

The invention relates in general to a signalling device for use wherever such a device can be utilized and the invention specifically relates to a signalling device designed for use on an automotive vehicle for indicating to persons exterior of the vehicle certain intents of the operator, such for instance, as the intent to slow down, to stop or to turn to the right or left in steering the vehicle.

The primary object of the invention is to provide in connection with such signalling device, a warning signal which will operate automatically on a failure of the signalling device to function and thus constitute an insurance against accident during the entire period of time that the vehicle is in motion.

In order to provide adequate protection to both the occupants of the vehicle and to others in so far as such protection is insured by a signalling device, certain requirements must be met. First, it is necessary to have a signal at the front of the vehicle so that the operator can warn and preferably prewarn an on-coming car; so that he can warn pedestrians in front of the vehicle and so that he can indicate to the traffic officer in advance of the vehicle an intended operation of the vehicle. Second, it is also required that the intent of the driver be communicated to the operator of a following vehicle. The requirements as thus far outlined necessitate forward and rear signals under the control of the operator of the vehicle and efforts have been made to meet these requirements by the use of front and rear, right and left signals which are controlled by several means. In some instances, the control is effected by manually actuated buttons or other forms of switches positioned convenient to the operator. In other devices the signals are controlled automatically by the steering mechanism, by the brakes and clutches, and by a form of pre-indication control such as is disclosed in the following copending applications in which I am a joint inventor:—

Serial No. 634,620, filed April 25, 1923, Direction indicators for vehicles, Serial No. 650,010, filed July 7, 1923, entitled Direction indicator attachment (1176); Serial No. 650,011, filed July 7, 1923, entitled Direction indicators (1183).

One difficulty with such signalling devices now known is that neither the operator nor persons exterior to the vehicle are warned in case the signalling device fails to function for any reason. For example, an operator may cause the proper signal to function, such for instance, as a signal that the vehicle is about to turn, and then, at the instant of turning the signal may fail, a light may go out or a circuit may become inoperative, and results either in a false signal, or the development of confusion on the part of the person signalled due to the failure of the vehicle to follow the course indicated by the signal.

Accordingly, the invention features an alarm signal which will be normally inoperative and which will indicate by suitable visual and audible signal whenever something goes wrong with the indicating signal.

Another object of the invention is to provide in connection with a signal system of the type outlined a safety signal disposed in position visible to the operator and which signal will be maintained while the signal system is in operative position capable of its normal indicating function and which safety signal will automatically become inoperative on the failure of the indicating signal to function.

Still another object of the invention is to provide in connection with such an indicating system a notice compelling or alarm device which will be normally inoperative but which will violently and forcibly call the attention not only of the operator but of persons exterior to the car to the fact that something is wrong with the signalling system.

Another object of the invention is to provide a signalling system of the type outlined which will be substantially automatic in its operation and which will require a minimum mental and physical effort on the part of the operator to insure its operation.

This phase of the invention is attained by connecting the signalling system with the usual ignition controlling key or switch now in general use so that the act of turning on the ignition will simultaneously bring the signalling device into operative working condition and further this object is attained by coupling the control of the indicating signal with the steering mechanism so that the steering of the vehicle will automatically cause the proper signal to function as more fully defined in the above identified copending applications.

Much confusion is caused by the direction indicating signals now in general use and this confusion becomes particularly dangerous in foggy, rainy weather. An operator of a following car usually sees ahead of him simply a red light, usually the "tail light" and then suddenly through the fog he sees another red light or at best he sees simply a blurred signal which conveys no information as to whether the preceding vehicle is to take a right or left turn, or that it may indicate a stop. This confusion is due largely to the fact that a blotch of red light appearing in the darkness and not infrequently under conditions where the car carrying the light is barely visible, if at all, conveys no definite information and even if the signals were marked or illuminated "Right" or "Left" it is impossible to distinguish any such designations under the situation outlined.

Accordingly, another object of the invention is to provide in connection with right and left indicating lights a point of reference, such for instance, as a different colored light disposed so that the operator of the following car will know that a danger light appearing to the right of the reference light would mean a turn to the right and correspondingly a danger light appearing to the left of the reference would mean a turn to the left. It is herein suggested that this reference light be the usual red tail light so that one light will perform the dual function of a tail light and a reference light positioned between right and left direction-turning-indicating lights.

In general the invention features the adoption to an automotive vehicle in so far as circumstances will permit of the features approved by the railroad systems to insure the safety of train travel.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings there is shown in diagrammatic form a preferred embodiment of the invention with the several mechanical parts shown symbolically together with the necessary electrical connections but it is obvious that the showing is merely suggestive and must be modified to meet the peculiar requirements of the different makes of vehicles upon which it is to be installed.

In the drawings there is shown certain conventional parts now found in automotive vehicles employing internal combustion engines. For instance, there is shown the source of electric energy 10 grounded on one side as shown at 11 and the other side of which a battery leads through the usual ignition control switch 12 to a conductor 13 leading to the coil (not herein illustrated). There is also disclosed a conventional form of red tail light 14 with its usual source of energy and light switch (not herein illustrated). It is to be further assumed that the vehicle is equipped with a horn 15 grounded on one side as shown at 16 and controlled by a button in the conduit 17 all as is well known in automotive vehicle equipment.

The disclosure also features known practice in providing at the front of the vehicle a front signal 18 provided with two lights 19 and 20 spaced apart horizontally, and one of which (19) will be referred to hereinafter as a right turning indicating signal and the other (20) will be referred to as a left turning indicating signal. Similarly a signal 21 is positioned at the rear of the vehicle. This signal 21 is likewise provided with two lights 22 and 23, the former of which constitutes a right turning indicating signal and the light 23 constitutes a left indicating turning signal.

In order to distinguish the right and left signal at a distance and in foggy, cloudy, rainy weather it is suggested that the signals 22 and 23 be positioned on opposite sides, considered horizontally, of the red tail light 14. Similarly it is obvious that the front signal 18 may be provided with a front reference signal 24 positioned between the lights 19 and 20 as indicated by the dotted position in the drawings.

It is further suggested that the direction indicating signals be of some color which will be readily visible and which will be different from the conventional red employed to designate the tail light. It is suggested, following approved railroad signal practice, that these direction indicating signals be yellow. In order to provide a selective control for causing both of the right indicating signals or both of the left indicating signals to function simultaneously or separately where but one signal is used there is provided a manually actuated control indicated symbolically by the pivoted switch 25 so arranged that closing one contact 26 will cause the left signal to function and closing the contact 27 will simultaneously intercept the actuation of the left signal and cause the right indicating signal to function. It will be understood that the manual control thus symbolically described may be any of the usual push button controls; may be the control from the pedals or steering mechanism but preferably is a type of control such as is disclosed in the above identified copending applications where there is featured a pre-indication followed by the actuation of the steering mechanism.

The present disclosure features the disposing of the signalling device so as to be operatively controlled by a suitable switch and it is herein suggested that this switch be the usual ignition switch so that the single act of turning the ignition switch so as to turn on the ignition will simultaneously position the signalling system in condition to be operated. It is further suggested that the source of energy for the ignition be utilized to supply the signal system herein featured and for this purpose the main supply line 28 is connected electrically to the conductor 13.

In the present disclosure there is provided a dash board or instrument board signal 29 provided with two lights, a normally active safety light 30, and a normally inactive danger light 31. The selective activity of the lights 30 and 31 is controlled by the switch 32 forming part of a differential relay 33. The switcch 32 is normally maintained in position through the agency of an adjustable spring 34 to maintain the safety light active. Referring to the differential relay it will be understood that the core 35 of the relay which controls the switch 32 is provided with oppositely disposed balanced windings 36 and 37, both connected to the main conductor 28 through a fuse 38.

Referring to the wiring of the indicator signals herein disclosed it will be seen that a conductor 39 leads from the winding 36 to the front signal 18 where it is branched at 40; one branch 41 leading through the light 20 to the switch 26 and the other branch 42 leading through the light 19 to the switch 27. Similarly, a conductor 43 leads from the winding 37, is branched at 44, with one branch 45 leading through the light 23 to the switch 26 and the other branch 46 leading through the light 22 to the switch 27. From this construction it will be understood that closing one of the circuit switches, such for instance, as switch 26 will cause current to flow from the battery, past the closed ignition switch, through the fuse, through both of the windings 36 and 37, through the lamps 20 and 23 thus causing the left signal at the front and rear of the vehicle to function. Similarly closing the switch 27 will cause the signals 19 and 22 to function. Due to the balanced relations of the windings 36 and 37 it is appreciated that under these circumstances the passing of current in this way through the differential relay will have no electromagnetic effect upon the relay, such as would cause the coil thereof to attract the switch 32. It thus results that normally current will pass from the conductor 28 through the switch 32, through the conductor 47, through the light 30 and become grounded as indicated at 48.

The coil of the differential relay is provided with an unbalancing winding 49, connected to the conductor 28 on opposite sides of the fuse. From this construction it is apparent that the energizing of the core 35 will cause the same to attract the switch 32 and to move the same against the resistance of the spring 34 and into position to complete the circuit through the conductor 50, through the danger light 31 to ground as indicated at 48.

In those situations where it is desired to cause the horn to function as a notice compelling device to indicate to persons exterior of the vehicle that something is wrong with the signalling system, the horn 15 is connected through a conductor 51 branched off of the conductor 50 at the point indicated at 52.

It is suggested that suitable manually actuated control switches be positioned wherever desired in the circuit and there is herein illustrated a switch 53 for controlling the horn; a switch 54 for controlling the danger light and a switch 55 for controlling the safety light.

In operation it will be understood that the direction indicating signals will function as suggested and the operation will be independent and not affected by the presence of the differential relay in the system. However, if any of the usual accidents occur to the parts which go to make up the direction indicating signal system then the relays come into play for shifting the switch from its normal, safety indicating position into a position to sound an alarm.

For instance, the blowing of the fuse, the blowing out of any of the four direction indicating lights, the opening of any part of the circuit beyond the relay or the grounding of any part of the circuit in a way to cause a difference in current flow in the windings 36 and 37 will energize the coil and cause the same to shift the relay switch 32.

In this way the operator can see that the safety signal is no longer functioning even should the switches 53 and 54 be turned off and in this way the operator is quietly advised either that the battery has failed or that something else is wrong with the signalling system. If the switch 54 is on then the red danger signal, on the instrument board, will light and the operator is advised that the battery is functioning but the signal circuits are affected. If the switch 53 is on the attention of both the operator as well as persons exterior to the vehicle is attracted by the continuous blowing of the horn.

By means of a device of the type herein disclosed it is possible to provide protection at all times from a failure of the signalling device to function. The device can be installed so as to be independent of any necessity of attention on the part of the operator, for it can connect to the ignition system so as to be turned off or on by the ignition key and the proper signals can be operated by the steering mechanism or by other parts of the vehicle operating mechanism. Not only is the operator warned of a failure of the device to function but the alarm warns the traffic officer and others both in advance and in rear of the vehicle to ignore the displayed signals if they should be functioning.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a device of the class described, the combination of elements forming a plurality of electric circuits, certain of said elements comprising in order a source of electric energy and a differential relay supplied thereby, means including a pair of signals electrically connecting the oppositely disposed windings of the relay, means including a second pair of signals similarly connecting the oppositely disposed windings of the relay, a pair of manually actuated signal controlling and circuit closing switches, one disposed in the first named signal circuit for controlling the first named pair of signals and the other disposed in the second named circuit for controlling said second pair of signals, a single manually actuated control operatively connected to both switches to cause one to open as the other is closed, and an alarm signal controlled by the electrical unbalancing of the relay.

2. In a device of the class described, the combination of means forming a plurality of electric circuits, comprising a source of electric energy, a differential relay supplied thereby, a control switch and a fuse contained in the circuit between the source and the relay, means forming a relay circuit branched from a point in the circuit between the switch and the fuse, said relay containing an unbalancing winding shunted around the fuse, said relay containing balanced windings, service signals contained in the circuit containing said windings, a control for said service signals and means contained in the relay circuit for indicating the operative condition of the circuit containing the service signals.

3. In a device of the class described, the combination of a relay including balanced windings, a circuit including signal devices respectively connected electrically to the opposite ends of said windings, a source of energy for said relay, a fuse between the source and relay, said relay provided with an unbalancing winding shunted about said fuse and a warning signal controlled by the relay.

4. In a vehicle, the combination of front right and left turn indicating signals, rear right and left turn indicating signals, a manually operable control switch and circuits connecting the same with said signals so that both right or both left signals may be energized simultaneously, common return circuits for both front and both rear signals, a differential relay including contacts and having balanced windings, one of said windings being connected in one common return circuit and the other winding being connected in the other common return circuit, an operator's indicating signal, and a circuit including said operator's signal and the relay contacts whereby a danger indication is given by said operator's signal if either right or either left signal fails to function when the said control switch is correspondingly actuated.

5. In a device of the class described, the combination of a source of electric energy, a differential relay having contacts and balanced windings with a common connection to said source, the respective independent ends of said windings being connected to pairs of electrically actuated signals, a double throw switch, circuits connecting contacts of said switch respectively to one signal of each of said pairs, a return connection from the blade of said switch to said source, and an alarm connected to said source through said relay contacts, whereby said windings are normally oppositely traversed by current when said switch is operated, and whereby the failure of one of said devices will effect the energization of said relay through the current flowing to the signal of the other pair which is connected to the same switch contact, and thereby close the relay contacts to energize said alarm.

6. In a vehicle, the combination of two sets of signals each including a right and a left turn indicating signal, a control for selectively causing either both right or both left signals to function simultaneously, a danger signal, a differential relay with one of said sets of signals included in one of its windings and the other set of signals included in its other winding, and means including said relay and coacting with said control to cause said danger signal to function if any one of the right or left turn signals fails to function upon the actuation of said control.

Signed at New York city, in the county of New York and State of New York, this 20th day of June, A. D. 1923.

HOWARD J. MURRAY.